May 12, 1936.   D. S. COLE ET AL   2,040,469
ELECTRIC GENERATING SYSTEM
Filed June 3, 1932   4 Sheets-Sheet 1

INVENTORS.
Dale. S. Cole
and
Leonard S. Speth.
ATTORNEY.

May 12, 1936.  D. S. COLE ET AL  2,040,469
ELECTRIC GENERATING SYSTEM
Filed June 3, 1932  4 Sheets-Sheet 2

INVENTOR.
Dale S. Cole
and
Leonard S. Speth.
BY
ATTORNEY.

May 12, 1936.  D. S. COLE ET AL  2,040,469
ELECTRIC GENERATING SYSTEM
Filed June 3, 1932   4 Sheets-Sheet 3
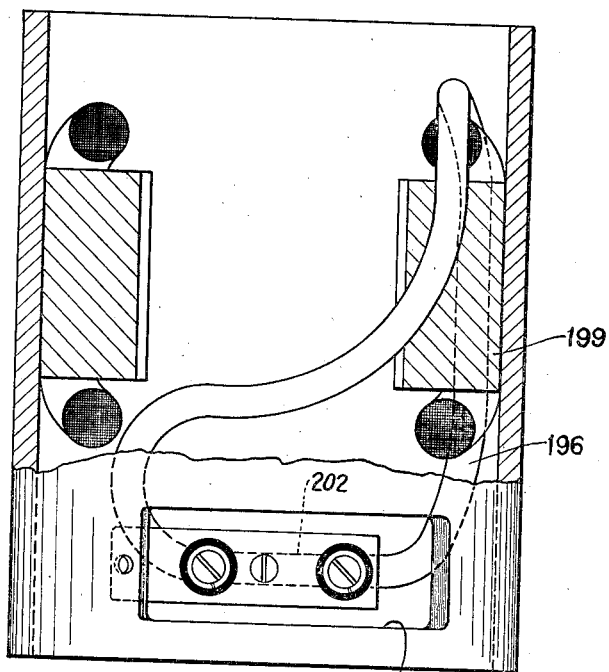
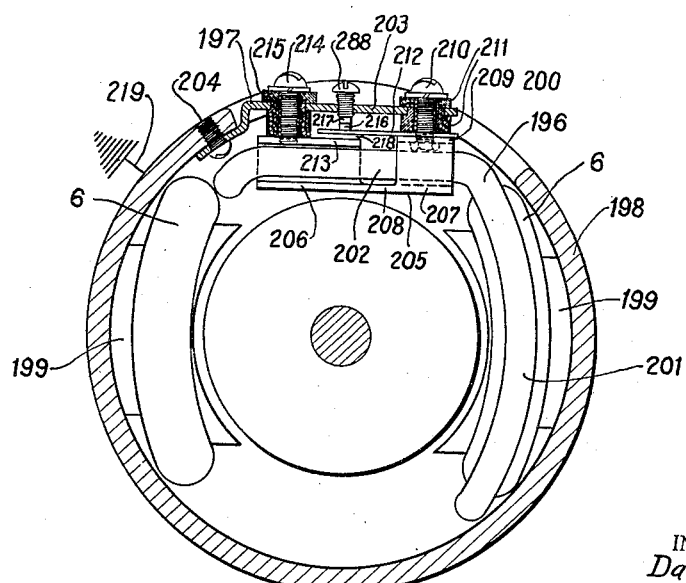
INVENTOR.
Dale S. Cole
and
Leonard S. Speth.
BY
ATTORNEY.

May 12, 1936.  D. S. COLE ET AL  2,040,469
ELECTRIC GENERATING SYSTEM
Filed June 3, 1932    4 Sheets-Sheet 4
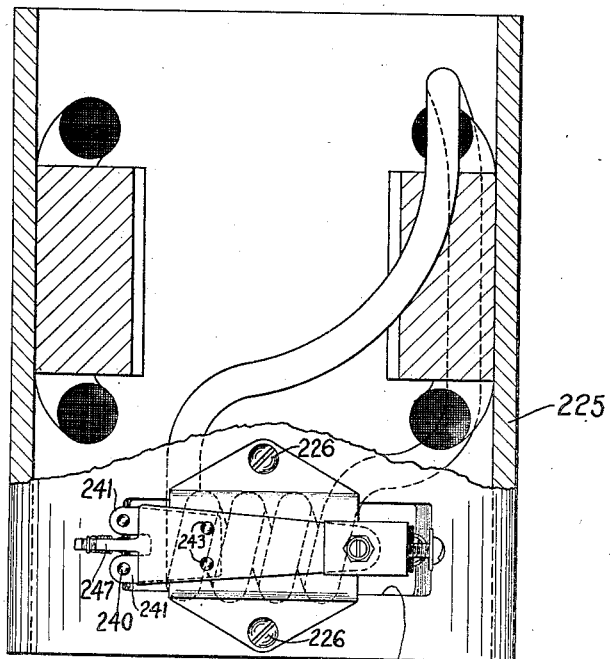
Fig 15
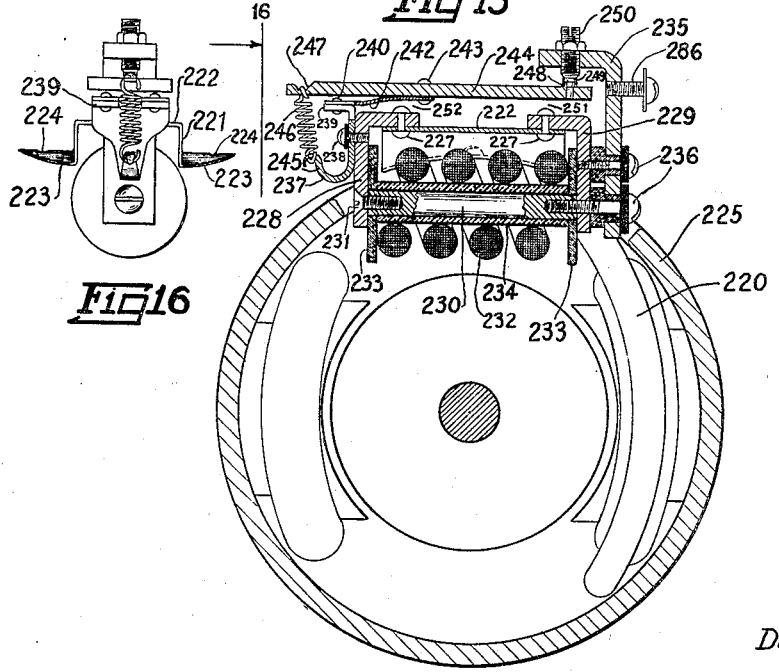
Fig 16
Fig 14
INVENTORS.
Dale S. Cole.
and
Leonard S. Speth.
BY
Slengh and Canfield
ATTORNEY.

Patented May 12, 1936

2,040,469

UNITED STATES PATENT OFFICE 2,040,469

ELECTRIC GENERATING SYSTEM

Dale S. Cole, Cleveland Heights, and Leonard S. Speth, Cleveland, Ohio, assignors, by mesne assignments, to The Leece-Neville Company, Cleveland, Ohio, a corporation of Ohio Application June 3, 1932, Serial No. 615,170

16 Claims. (Cl. 171—313)

This invention relates to electric generating systems and apparatus, and particularly to generating systems and apparatus in which an electric generator is rotatably driven by a variable speed source of power.

Typical of such generating systems and apparatus is that employed on automotive vehicles, wherein an electric generator is driven by the vehicle engine.

Such systems commonly include a storage battery, lamps and other apparatus energized by current from the generator, and various means have been accordingly devised to regulate or control the output of the variable speed generator to maintain the same within limits suitable for the energized apparatus.

For example, in some systems the current output has been controlled or regulated by the so-called "third brush" generator construction; in another system, the generated voltage has been regulated by so-called "voltage regulation" apparatus accessory to the generator.

Both the current regulation systems and voltage regulation systems heretofore employed have merits which have led to their use on motor driven vehicles.

The control of the generator output by regulating its voltage is generally recognized as superior to the current regulation, particularly when storage batteries and lamps are to be energized by the generator; but its general adoption has been prevented by the relatively great cost of the apparatus accessory to the generator by which the voltage regulation is effected.

In a typical voltage regulation system and apparatus for example, a regulating panel is provided on which is mounted an electro-magnetic relay having its winding energized by the generator voltage; and the contacts of the relay control the energization of the generator field winding. Upon a rise of voltage above the predetermined desired value, the relay contacts are operated magnetically to break the field winding circuit, or to insert resistance in series with the field winding or otherwise to weaken the field to effect a reduction of voltage. When the voltage falls to the predetermined value, the relay contacts are operated by a spring to restore the field circuit. In operation, such relays open and close rapidly with a vibratory movement.

It is the added cost of manufacturing and installing such regulator panels and the vibratory electro-magnetic relays and other necessary parts thereon which has largely prevented the general adoption of voltage regulated generator systems for automotive vehicles, and which has confined its use to a limited field of application.

The instant invention therefore has for one of its objects the provision of an improved method and means whereby the voltage output of a variable speed electric generator may be regulated to a substantially constant value at all speeds within a predetermined working speed range.

Another object is to provide an improved electric generator construction which will deliver at its output terminals a substantially constant voltage at all speeds within a predetermined working speed range.

Another object is to provide an improved method and means whereby the current output of a variable speed generator may be limited to a predetermined maximum, and also the voltage output thereof may be regulated to a substantially constant value at all speeds within a predetermined working speed range.

Another object is to provide an improved electric generator construction which will deliver at its output terminals a substantially constant voltage and a current load limited to a predetermined maximum at all speeds of the generator within a predetermined working speed range.

Another object is to provide an improved regulating apparatus for effecting voltage regulation of a variable speed generator.

Another object is to provide an improved generator field circuit controller for effecting voltage regulation of a variable speed generator, and which will be cheaper to manufacture than the electro-magnetically vibrated relay apparatus now employed for this purpose.

Another object is to provide an improved controller means whereby the field flux strength of a variable speed electric generator may be controlled to effect a substantially constant voltage at the generator terminals within a working speed range, and the operation of which controller means may be effected by the field flux itself.

Another object is to provide an improved method and means whereby the voltage output of a variable speed generator may be regulated to a substantially constant value within a working speed range; and wherein field flux of the generator may be employed to effect the voltage regulation.

Another object is to provide an improved field energizing circuit for variable speed voltage regulation electric generators.

Another object is to provide, in a voltage regulated variable speed generating system of the type employing a vibrating switch contact in the field circuit, improved means for minimizing the tendency to arc at the contacts.

Another object is to provide, in a voltage regulated variable speed generating system of the type in which the field energization is rapidly changed, improved means for increasing the frequency of the changes to correspondingly increase the frequency of the resulting pulses of current in the work circuit of the generator.

Another object is to provide for electric generators and generating systems wherein switch contacts are opened and/or closed responsive to changes of electrical conditions of the system, an improved switch construction and mode of operation whereby the operation of the switch may be effected through the agency of the magnetic flux of the generator field.

Another object is to provide an accessory apparatus which may be installed upon commercial variable speed generators to adapt them to automatically regulate their voltage output to a substantially constant value at all speeds within a working speed range.

Our invention is fully disclosed in the following description taken in connection with the accompanying drawings in which, Fig. 1 is a diagram of electrical connections and apparatus illustrating in diagrammatic form some of the features of an embodiment of our invention;

Fig. 12 is a cross sectional end view of a commercial electric generator illustrating the embodiment of our invention in an accessory apparatus applied to the generator;

Fig. 13 is a top plan partial view, partly broken away of the generator and accessory apparatus of Fig. 12;

Figs. 14 and 15 are views similar to Figs. 12 and 13 but illustrating a modification;

Fig. 16 is a view taken from the plane 16 of Fig. 14.

Figure 1:
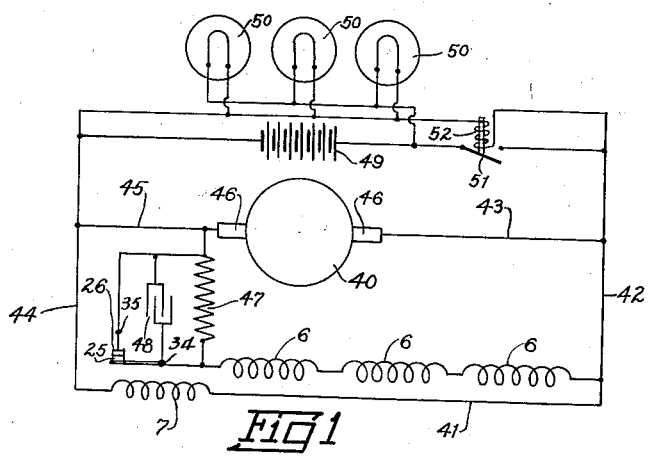
Figure 3:
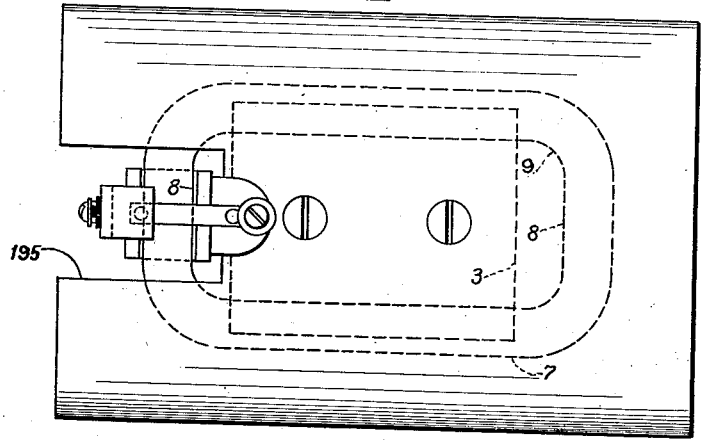
Fig. 3 is a top plan view of the generator elements of Fig. 2.
Figure 2:
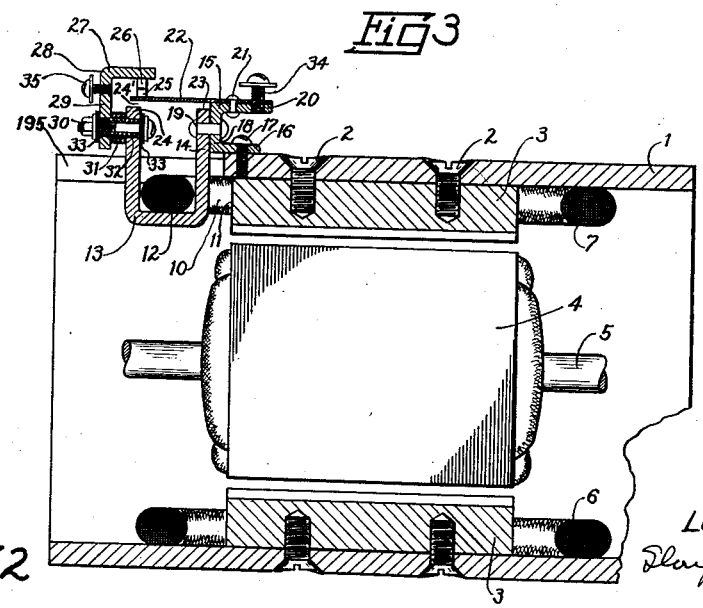
Fig. 2 is a simplified longitudinal cross-sectional view of an electric generator forming a partial embodiment of my invention.

Referring to the drawings, we have shown in Figs. 1, 2 and 3, one embodiment of our invention and a system of circuit connections and apparatus whereby the embodiment of Figs. 2 and 3 may be practiced.

In Fig. 2 at 1, we have shown the hollow cylindrical steel shell constituting the yoke of an electric generator field. Such a shell type yoke is well known in this art and constitutes a part of a housing for the generator. The end plate, bearings for the armature, shaft, etc. have been omitted for simplicity inasmuch as these parts constitute no essential part of our invention and are well understood by those skilled in this art.

Secured to the inner wall of the shell 1 as by screws 2—2 and projecting inwardly radially therefrom, we have shown at 3—3 two field poles. The generator of Fig. 2 is a multi-polar generator having a total of four poles 3, two only of which are shown in Fig. 2, in diametrically opposed relation.

An armature 4 supported on a shaft 5 may be rotatively driven between the poles 3 in a well known manner.

Each of the poles 3 has a winding for energizing the same; and the generator under consideration having four poles, is provided with windings 6—6—6 on 3 of the poles and a winding 7 on the fourth pole.

The field windings 6 and 7 are all of the same form and as usual in such constructions are preferably form wound. The poles 3 are rectangular as indicated in Fig. 3 being longer in the axial direction of the generator and the field windings are preferably form wound to lie closely adjacent to the poles 3 on their long side and to clear the ends of the poles as at 8 due to the relatively large radius, as at 9, to which the coils are wound. A space 10 is thus provided between the end 11 of the pole 3 and the end convolutions 12 of the windings.

At one end of the windings 7 as shown in Figs. 2 and 3, a U-shaped core 13 of iron or other ferrous material is linked with the windings 7 by projecting one leg 14 of the U upwardly through the space 10 above described. A recess 195 is cut or otherwise formed in the shell 1 upwardly through which the core is projected.

The core 13 is mounted upon the shell 1 by means of a channel shaped bracket 15, having one leg 16 secured to the shell 1 by a screw 17 and having the web 18 of the channel riveted as at 19 to the leg 14 of the core 13.

Riveted to the other leg 20 of the channel as at 21 is a resilient steel or other ferrous, magnetically tractable reed-like armature 22 which extends across and adjacent to the pole ends 23 and 24 of the U-shaped core. An air gap 24' is thus provided between the pole end 24 and the armature 22.

By this construction it will now be clear that current flowing in the windings 7 to produce field magnetism in the pole 3 of the generator will also produce magnetism in the core 13 which, acting across the air gap 24' will attract the armature 22 against its inherent resilience.

An electric contact 25 is mounted on the armature 22 and engages a mating contact 26 supported upon the overhanging arm 27 of a bracket 28 a vertical leg 29 of which is rigidly secured to and electrically insulated from the core 13 by a bolt 30, an insulating spacer 31 and the well known insulating sleeve or bushing 32 and washers 33 associated with the bolt 30.

An electric circuit terminal screw 34 may be associated with the contact 25 by being threaded into the leg 20 of the bracket above described and a terminal screw 35 may be provided corresponding to the contact 26 and threaded into the leg 29 of the bracket.

Referring now to the diagram of Fig. 1, the generator as a whole indicated conventionally at 40 energizes its own field winding, the winding of one pole, namely the winding 7 being connected by wires 41, 42, 43, 44 and 45 directly across the brushes 46—46 of the generator. The windings 6—6—6 are all connected in series and are connected across the generator brushes 46 through contacts 25 and 26 when these contacts are closed; or, when they are open, through a resistance 47; and a condenser 48 may if desired be provided to suppress arcing which may occur at the contacts 25—26 when they open.

The diagram 1 otherwise comprises a storage battery 49 connected across the mains 42 and 44 and therefore across the generator brushes and a plurality of lamps 50—50 connected across the mains 42 and 44.

The contacts 25 and 26 of Fig. 1 may be those of Fig. 2 and the points 34 and 35 of Fig. 1 illustrate the connection which may be made to the screws 34 and 35 of Fig. 2 in order to connect the apparatus of Fig. 2 in a diagram such as Fig. 1.

At 51 we have indicated a switch, operable by a winding 52 energized directly across the brushes 46 of the generator 40 to perform the well known function of closing the circuit through the battery 49 only when the generator is generating a voltage sufficient to balance or to charge the battery.

In the operation of the form of our invention shown in Figs. 1 to 3 inclusive, when the generator armature 4 is rotated, and its speed gradually increased, its field windings 6 and 7 are energized by a gradually increasing voltage and current. To properly charge the battery 49, assuming the same to be a "6 volt" battery, the generator voltage should not rise to a value exceeding some predetermined value such for example as 7.5 volts.

The energization of the winding 7 besides producing flux in the field pole 3, produces magnetic flux in the core 13, this flux flowing in the U-shaped core and across the air gap 24' through the armature 22.

The rising voltage of the generator as its speed increases, increases the energization of the field winding 7; and the resilience of the armature 22, length of air gap 24' and other features of the construction as will be understood by those skilled in this art, are so designed that when the voltage impressed on the field winding 7 rises to the predetermined value such as 7.5 volts, the flux generated in the core 13 will be sufficient to attract the armature 22 and separate the contacts 25—26. The circuit to the field windings 6—6—6 is thus broken, or the energization thereof is greatly reduced by insertion of a resistance such as that at 47 Fig. 1, and the generated voltage accordingly falls. The falling voltage decreases the energization of the winding 7 which decreases the flux in the core 13 and a point is reached at which the resilience of the armature 22 will cause it to retract from the pole 24 and to close the contacts 25—26 re-establishing the field circuit for the windings 6.

The voltage again rises and again the contacts 25—26 open and this action continues, the armature 22 moving with a rapid vibratory movement, to rapidly open and close the contacts 25—26. The voltage output of the generator thus is prevented from rising above 7.5 volts, for example, and may be prevented from falling any substantial amount by suitably determining the resilience of the armature 22 and thus the voltage impressed by the generator on the battery and lamp circuit, is substantially constant at all speeds above the minimum speed at which, with full field energization, it can generate 7.5 volts. Such a range of speed may be referred to as the working speed range.

It is important that the weakening of the field effected by opening the contacts 25—26 shall occur rapidly, that is to say that the field current of the windings 6 shall be reduced rapidly. There are two principal reasons among others. If the field dies out slowly, there will be a tendency to arc at the contacts 25—26 and the slower the current dies out the more will be prolonged any arc which occurs; and second, the slight fluctuations of voltage, effected by opening and closing of the contacts 25—26 and the accompanying fluctuation of field strength, may cause a visible flickering of lamps 50—50 energized by the circuit which obviously is objectionable.

According to our invention, both of these and other objectionable features of operation which are introduced into a generating system, having a battery and lamps in the circuit, by the rapid opening and closing of the field circuit, may be eradicated in a novel manner. For this purpose the winding 7 may be wound reversely as to polarity with respect to the windings 6. That is to say, in a multi-polar generator having for example four field windings, the polarity of the windings alternates proceeding around the generator and we reverse the polarity of one of these windings and utilize it for the winding 7.

Referring to Fig. 1, when the contacts 25—26 open, the flux produced by the windings 6—6—6 immediately begins to decay causing a reduction of voltage and this action is accelerated by the flux produced by the winding 7 which is in the reverse direction tending to generate a counter voltage. Thus the decay of field flux and the corresponding decay or reduction of generated voltage, occurs very rapidly and much more rapidly than if the reverse winding 7 were not employed.

The winding 7 is preferably weaker as to ampere turns than a winding 6 so that its reverse magneto motive force does not greatly reduce the total flux producing magneto motive force of the field windings taken as a whole, and therefore has little effect upon the field strength as a whole or upon the output of the generator; and whatever diminution of output does result from the reversed winding 7 can easily be made up or compensated for by a corresponding increase of copper in the armature winding.

By thus providing a winding 7 relatively weak, and in the reverse direction, it will have sufficient magneto motive force to cause a rapid drop of voltage when the contacts open, but will retard very little the building up of the total generator flux of the windings 6—6—6, when the contacts 25—26 again close. Thus the voltage will build up very rapidly on closure of the contacts due to the rapid overpowering of the winding 7 by the windings 6—6—6 when energized and will also die out very rapidly due to the opposition of the winding 7, when the windings 6—6—6 are de-energized.

The result is a very rapid change of voltage concurrent with the opening and closing of the contacts 25—26 and this high frequency diminishes or entirely obviates objectionable flickering of lamps such as 50—50 connected to the generator.

Again, due to the presence and above described action of the opposing or "bucking" winding 7, a lower resistance 47 may be employed to effect a given reduction of field strength and corresponding reduction of voltage upon opening of the contacts; and with less resistance 47, there will be, across the contacts 25—26 at their time of opening, a lesser potential and hence less tendency to spark.

Thus, as set forth above, the frequency of fluctuation of voltage resulting from the periodic change of field strength is greatly increased to eliminate flickering of the lamps, and the tendency to spark or arc at the contacts 25—26 is greatly reduced or eliminated, and both of these results are obtained by employment of the reverse field winding 7.

As will now be clear, by the embodiment of our invention illustrated in Figs. 1 to 3, we have provided a means and method for regulating the voltage output of a variable speed generator wherein a field winding of the generator may be employed to function both as a field winding and as the exciting winding for a switch having contacts controlling the energization of the field circuit in a manner to maintain a voltage substantially constant, or within predetermined maximum and minimum limits, throughout a working speed range. The elements of the switch illustrated in Figs. 2 and 3 are adaptable to be mounted upon the generator itself thus dispensing with a separate supporting panel or the like. The generator including its regulating switch therefore, may be manufactured as a complete self-regulating generator unit, the generator delivering at its terminal brushes the said substantially constant voltage. Furthermore, where high frequency of voltage regulating fluctuations and/or reduced tendency to spark at the contacts is important or desirable, we have as hereinbefore described provided means for effecting the same by employing one reversed field winding and energizing the same across the generator brushes independently of the circuit energizing the other field windings 6—6—6.

While we have illustrated at 48 a condenser, it may be omitted and is not an essential part of our invention.

One of the advantages of our invention as set forth above is that the cost of producing a voltage regulating generator is considerably reduced. The employment of a switch in the field circuit which can be mounted on the generator frame itself eliminates the necessity for an additional panel and support therefor; and the employment of the field winding as the energizing winding of the switch makes the provision of an electromagnet especially for operating the switch unnecessary, and due to the bucking or reversed energization of the winding 7, less resistance in the unit 47 is necessary and the resistant unit becomes relatively small and simple and therefore, cheaper.

The resistance unit 47, as in some prior art practice where resistance units are employed generally in generator field circuits, may be wound into a flat coil, inductively or non-inductively and attached to the outer surface of one of the field windings, as a support for the same.

While we may prefer to employ the voltage regulating system of connections of Fig. 1 (with or without the condenser 48, and with or without the resistance unit 47), we have shown herein other systems of connections in which some or all of the advantages of our invention may be enjoyed.

Figure 4:
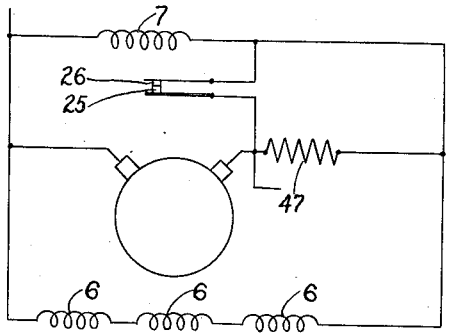
Figs. 4, 5, 6 and 7 are diagrammatic views similar to Fig. 1 illustrating modifications.

In Fig. 4 is illustrated in simplified form omitting batteries, lamps, etc., a modification of the diagram of Fig. 1. The resistance unit 47 is so connected that it is normally short-circuited on the contacts 25—26, but when these contacts are opened by magnetic energization from the field winding 7, the resistance 47 is in the path of the current flowing to the winding 7 as well as that flowing to the windings 6—6—6 and thus reduces the current in all of the windings.

Figure 5:
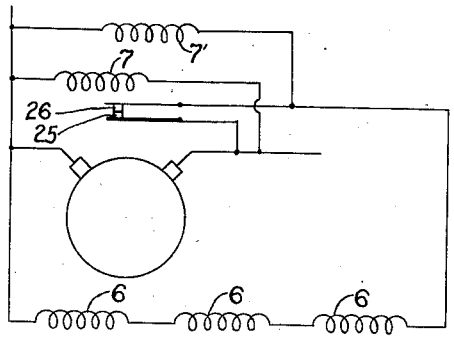

In the modification shown in Fig. 5, the regulating winding 7 is in two parts 7 and 7'. Part 7 is connected directly across the generator terminal. The part 7' is connected across the terminals through the contacts 25—26, and the field windings 6—6—6 are connected across the terminals through the contacts 25 and 26.

The two parts 7 and 7' of the field windings are wound in the same direction so as to assist each other and may be parts of a single winding wound on a single field pole.

In this system of connections, no resistance unit 47 is employed. When the contacts 25—26 open, the field windings 6—6—6 may discharge back through the portion 7' of the winding so that the part 7' now opposes the part 7 and partly neutralizes it; and furthermore, apart from the reverse energizing current from the discharging field, the opening of the contacts 25—26 effects a reduction of potential upon winding 7'. Thus the net energization of the windings 7—7' is greatly weakened. As a consequence the whole generator field is quickly weakened; and the generated voltage drops quickly; and the armature quickly retracts to close the contacts 25—26; arcing at the contacts is quickly suppressed; and the frequency of opening and closing of the contacts is increased resulting in a lessened tendency for lamps, that may be energized by the generator, to flicker.

Figure 6:
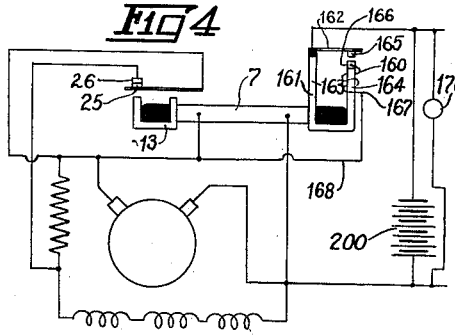

In the modification shown in Fig. 6 not only are the field controlled circuit contacts 25—26 opened by flux from a field winding, but a circuit breaker and reverse current relay shown generally at 160 is also operated by flux from a field winding. In the particular disclosure of Fig. 6, both devices are operated from a single bucking field winding 7. The U-shaped core element 13 and the manner of its operating contacts 25 and 26 to effect voltage regulation, including the bucking operation thereof has already been explained. Another part of the winding 7, preferably an opposite end portion thereof has looped therethrough another generally U-shaped core element 161 whereby it may receive flux produced by the winding 7. A resilient steel or other ferrous armature 162 is secured at one end to and insulated from a leg 163 of the U-shaped element and the other end is disposed opposite the end of the other leg 164. A contact 165 is carried by the end of the armature 162 and a stationary contact 166 is disposed adjacent to contact 165. A winding 167 around the leg 164 has one end thereof connected to the contact 166 and the other connected by a wire 168 to one side of the generator.

The generator voltage is impressed upon the winding 7 and when, upon increasing speed of the generator, it reaches a value sufficient to charge or "float" the battery 200, the armature 162 will be attracted by the core 161 and close the contacts 165—166. Current may then flow from the generator to the battery through the contacts 165—166 and through winding 167. Upon reduction of voltage the battery 200 will cause current to flow reversely through the winding 167 neutralizing the effect of winding 7 and open the contacts at 165—166 in a well known manner to protect the battery against discharge.

Figure 7:
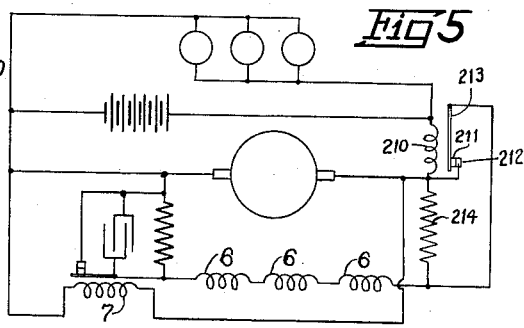

In the modification of Fig. 7, we have illustrated in addition to the circuit connections of Fig. 1, a winding 210, switch contacts 211 and 212 operable to be opened by attraction of an armature 213 by the winding 210; and a resistance unit 214 inserted in series with the field windings 6—6—6 when the contacts are opened. Normally the contacts are closed but upon an excessive current demand, or overload, in the battery, lamps, etc. of the supplied system the winding 210 will be energized sufficiently to open the contacts 211—212, insert the resistance 214, weaken the field, reducing the output to a safe value.

In the foregoing we have shown and described various apparatus and systems of connections whereby the voltage output of a generator driven at variable speed may be regulated to substantially a constant value. As hereinbefore mentioned, there are advantages to be obtained by what is called the "third brush" mode of generator regulation in which the current output is limited to a maximum predetermined valve by armature reaction within the generator. We find that the voltage regulation system and apparatus of our invention hereinbefore described may be applied to a third brush current regulated generator thus providing a generator and system which will regulate both to a maximum current and to a substantially constant voltage at all speeds within the working range.

A typical instance wherein it may be desirable to employ both current regulation and voltage regulation, is in a system in which the battery capacity is relatively great and which, when its state of charge is low, may, upon being charged, draw from the generator an excessively great current. The third brush regulation will protect the generator by limiting the possible current to a predetermined maximum and the voltage regulation will protect the battery by preventing an excess charging current from flowing into it. The voltage regulation additionally will charge the battery at the maximum permissible rate and taper the charge in the well known manner of voltage regulation charging systems and at the same time will protect any lamp in the circuit against damage from high voltage.

Figure 8:
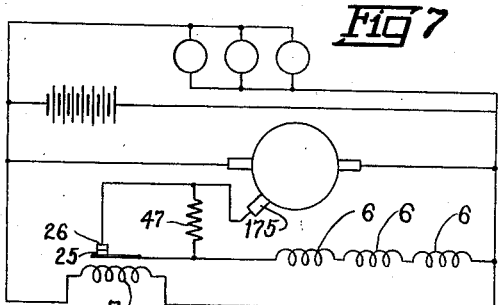

A system whereby both types of regulation may be accomplished is illustrated in Fig. 8. The field windings 6—6—6 are energized by current from the third brush 175 of the generator either through contacts 25—26 when closed, or through a resistance 47 when the contacts are open, and the bucking field winding 7 is energized directly across the main brushes of the generator. The regulation of the voltage is thus effected in a manner similar to that described hereinbefore, by opening of the contacts 25—26 and breaking the field circuit of the windings 6—6—6 or by inserting the resistance 47 in series with the windings 6—6—6, the contacts being operated by flux from the field winding 7 all as described hereinbefore. The current output will be regulated as in any well known third brush generator. Thus the current limit regulation may be referred to as being superimposed upon the voltage regulation.

Figure 9:
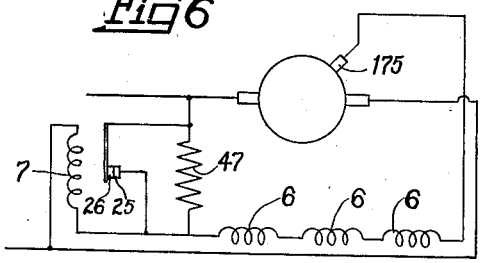
Figs. 8 and 9 are other diagrammatic views illustrating other modifications in connection with a third brush type of generator construction which we may employ.

In Fig. 9 an arrangement similar to that of Fig. 8 is shown but wherein the winding 7 is so connected as to be subject to the insertion of the resistance 47 upon opening of the contacts 25—26.

Any of the modifications of structure or modifications of wiring connections hereinbefore described may be employed to effect voltage regulation and other accessory functions in combination with the third brush current regulation features of the generator.

The generators hereinbefore discussed have been multi-polar generators having four poles. Obviously multi-polar generators with more than four poles may be employed with all the advantages of our invention.

Our invention is also applicable, with slight changes to bi-polar generators, and this will now be described.

Figure 10:
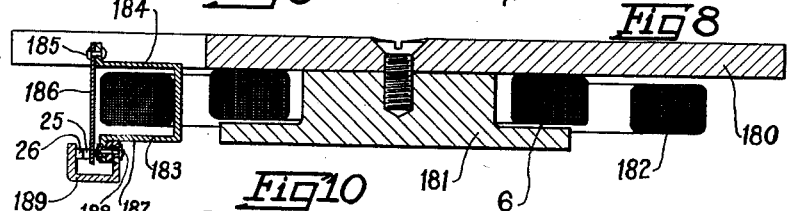
Fig. 10 is a view generally similar to a part of Fig. 2 illustrating a modification of our invention which we may employ in connection with a bipolar type generator.
Figure 11:
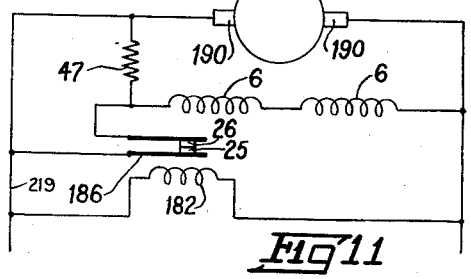
Fig. 11 is a diagrammatic view illustrating a system of circuits and apparatus which we may employ in connection with a bi-polar generator such as that fragmentarily illustrated in Fig. 10.

Referring to Fig. 10, we have shown the generator field shell 180 having a pole 181 and a field winding 6 thereon. A second winding 182 is super-imposed around the winding 6 and is wound reversely with respect thereto. A U-shaped magnetic core element 183 is looped through the winding 182 externally of the winding 6 and one U leg 184 has riveted to its extremity as at 185 a steel or other ferrous resilient armature 186 carrying at its free end a contact 25. The other leg of the U 187 has riveted to its free end as at 188 a non-magnet bracket 189 carrying a contact 26 adjacent to contact 25. The rivet construction at 188 may be insulated in any of the several ways illustrated hereinbefore. A suitable system for the generator of Fig. 10 is shown in Fig. 11. The main field windings 6—6 are connected across the generator brushes 190—190 either through a resistance 47 or directly through the engaged contacts 25 and 26. The contacts 25 and 26 are controlled by the winding 182 acting upon the armature 186 as above described.

When the terminal voltage of the generator reaches the predetermined value, the flux generated by the winding 182 becomes sufficient to open the contacts 25—26 to effect a weakening of the field windings 6—6 in a manner which will now be clear. Upon weakening of the field as described, the winding 182 being opposite to the winding 6 as to polarity, "bucks" the same and effects a rapid decay of flux in the pole 181 and thus accelerates the reduction of the voltage with the attendant advantages hereinbefore fully discussed.

In Figs. 12 and 13 we have illustrated an accessory apparatus which may be applied to a commercial generator to cause it when driven at variable speeds to deliver substantially constant voltage according to our invention.

The accessory apparatus comprises in general, a winding 196 and an electro-magnetic switch device 197 which may be manufactured and sold to the user to be applied to his commercial generator.

The generator under consideration is a two pole generator comprising the steel field shell 198 having field poles 199—199 and field windings therefor 6—6.

The steel shells 198 of generators of this type have an arcuate aperture 200 adjacent one end of the shell; and the winding 196, preferably a form wound winding, is shaped so as to embrace one of the poles 199 in one portion thereof as at 201, and at another portion as at 202 is disposed transversely of the generator shell and radially under the aperture 200.

The switch structure 197 comprising contacts and a magnetic circuit to be described, energized by the winding 196, is supported on a sheet metal base 203, disposed in the aperture 200 and secured to the shell 198 by screw 204.

The magnetic circuit of the switch, shown generally at 205 comprises a channel portion 206, disposed concavely toward the observer and a channel portion 207 disposed concavely from the observer, the two channel portions being connected by a connecting flange 208. The portion 202 of the winding 196 is disposed in the two channel portions 206 and 207 and thus constitutes a magnetic circuit partly encircling the winding portion 202.

The upper flange 209 of the channel portion 207 is secured to and insulated from the base 203 by a screw 210 and a suitable insulating bushing 211, a resilient steel armature or switch arm 212 being secured on the flange 209 between it and the bushing 211.

The upper flange 213 of the channel portion 206 is secured to and insulated from the base 203 by a screw 214 and a suitable insulated bushing 215.

A contact 216 secured to the switch arm 212 engages a contact 217 on the end of a screw 288 adjustably threaded through the base 203.

In operation, current in the winding 196 generates flux in the magnetic circuit 205, the flux flowing upwardly through the channel portion 207 to the switch arm 212 across the air gap between the switch arm and the upper flange 213 of the channel portion 206 and downwardly through the channel portion 206 and through the connecting flange 208 to complete the magnetic circuit.

The flux in the air gap 218, may attract the armature 212 and break contact at 217—216 when the energization of the winding 196 exceeds a predetermined value.

The circuit connection for the winding 196, the windings 6—6 and the contacts 216—217 may be the same as or similar to those for the corresponding parts 182, 6—6, and 25—26, of Fig. 11, a ground connection 219 in Fig. 12 corresponding to the line 219 of Fig. 11.

The accessory device described in connection with Figs. 12 and 13 may be installed upon a generator by a single screw 204 which rigidly mounts the base 203 on the generator frame. When so installed, and when the circuits of Fig. 11 are established, the generator will operate to deliver a substantially constant voltage output in a manner hereinbefore described, particularly in connection with Figs. 10 and 11.

In Figs. 14 to 16 inclusive, another form of accessory switch device and winding is illustrated. This form of accessory device functions the same as that of Figs. 12 and 13 but the winding 220 corresponding to the winding 196 of Fig. 12 is formed to generate more flux per ampere of current in the winding than in the form of Figs. 12 and 13, and the switch construction is of a different design.

The switch construction comprises a base 221 having a body portion 222, and a wing portion 223 the base being made from sheet metal and the wings being perforated as at 224 whereby the base may be rigidly mounted upon the generator shell 225 by screws 226—226.

The base 221 is preferably formed from non-magnetic material and has riveted at its opposite ends thereof as at 227—227, angle pieces 228 and 229 formed from steel or other magnetic material. A ferrous core 230 is connected to the angle members 228 and 229 by screws 231—236, and a plurality of turns 232—232 of the winding 220 encircle the core 230. Insulating heads 233—233 and an insulating sleeve 234 may insulate the turns 232 of the winding from the adjacent steel parts.

An angle form element 235 is rigidly secured to the angle element 229 by a pair of insulated screws 236—236, and the element 235 may be provided with a terminal contact screw 286 if desired.

A sheet metal three-legged bracket 237 is rigidly secured to the angle element 228 by a screw 238, and two of the legs thereof 239—239 have riveted thereto as at 240 two of the legs 241 of the three-legged flat sheet metal spring 242, the remaining leg of the spring being riveted as at 243 to a ferrous armature 244.

The remaining leg 245 of the bracket 237 is hook form and is hooked through one end of a tension spring 246, the other end of which is hooked over a tail portion 247 of the armature 244 rearwardly of the bracket leg 239.

By this construction, the armature 244 has a free resilient hinging movement upon the spring 242 and is resiliently constrained toward a counter clockwise position by the spring 246. At the end opposite the spring 246, the armature 244 carries a contact 248 engaging a mating contact 249 on the end of an adjusting and supporting screw 250 threaded through the element 235.

Flux generated in the core 230, by the turns 232 of the winding 220 flows through the core, through the angle element 229, across the air gap 251 between the element 229 and the armature 244, through the armature 244, across the air gap 252 between the armature and the angle element 228, and through the angle element 228 back to the core 230.

The tractive effort of the magnetic flux in the air gaps will attract the armature 244 and open contact at 248—249, whenever the current energization in the coil windings 232—232 exceeds a predetermined value.

The electro-magnetic device above described may be disposed with portions thereof including the winding turns, 232—232, within the aperture 253 formed in the shell 225 of the generator.

As in the form of Figs. 12 and 13, the form of Figs. 14 to 16 may be connected in the circuits of a two-pole generator as indicated in the diagram Fig. 11.

It will be apparent also that the electro-magnetic switch and winding construction described in connection with Figs. 12 to 16 inclusive, may be manufactured as a separate accessory and sold to users of commercial generators to adapt the generator to voltage regulation.

While we have illustrated the accessory devices of Figs. 12 to 16 inclusive as applied to two-pole generators, it will be apparent that they may be applied to generators having more than two poles.

In the practice of our invention, the effects of the voltage regulation upon the supplied system is similar to that of prior art voltage regulation systems. But the switch construction which we employ and its mode of operation distinguish from that of the prior art, in, among other features, the complete elimination of the relatively expensive regulating panels and complete electro-magnetically operated switches thereon and other prior art accessory apparatus. According to our invention, the switch contacts 25—26 controlling the field circuit and effecting voltage regulation to a substantially constant value, are operated by energy from a winding on a field pole. Thus we completely eliminate all electro-magnetic windings provided solely to effect voltage regulation. Although the regulating winding is a reverse winding, such winding is not provided solely to perform a voltage regulating function, because, according to our invention, such reverse field winding performs also the bucking function hereinbefore discussed which function of course is impossible with any voltage regulating relay winding of the prior art disposed external to the generator. Even in the case of the two-pole generator, Figs. 18 and 19, and Figs. 12 to 16 inclusive, wherein an additional winding 182, or 196 or 220 is provided to operate the voltage regulating contacts, such winding, due to its disposition on the field generator pole performs the aforesaid bucking function which is impossible with the prior art external relay winding.

Our invention is not limited to the exact details of construction shown and described. Other changes and modifications may be made therefrom without departing from the spirit and scope of the invention and without sacrificing its advantages.

We claim:

1. As an article of manufacture adapted to be applied to a commercial electric generator, an electro-magnetic switch construction and a winding, the winding having a loop portion formed to embrace a pole of the generator to oppose the normal pole winding, and having a portion formed to energize the switch magnetic circuit.

2. As an article of manufacture adapted to be applied to a commercial electric generator, an electro-magnetic switch construction and a winding, the winding having a loop portion formed to embrace a pole of the generator to oppose the normal pole winding, and having a portion formed to energize the switch magnetic circuit, and the switch construction comprising a support adapted to be secured to the generator frame.

3. As an article of manufacture, adapted to be applied to a commercial electric generator, an electro-magnetic switch construction comprising a supporting frame adapted to be rigidly secured to the generator frame, a ferrous magnetic circuit, a pair of normally resiliently closed switch contacts and a magnetically tractable element for opening the contacts when the magnetic circuit is energized above a predetermined value; and a winding having a loop portion formed to embrace a pole of the generator to electro-magnetically oppose the normal winding of the pole, and having a portion formed and disposed to energize the switch magnetic circuit.

4. In an electric generating system and apparatus, an electric generator adapted to be driven at variable speed, the generator having a plurality of shunt field windings energized commensurably with the generated voltage and of normal polarity, and a shunt field winding of reverse polarity, a voltage regulator responsive to flux generated by the reverse polarity winding to control the generated voltage, a load circuit for the generator, a switch controlling the load circuit, a magnetically tractable switch-operating element disposed in the path of a portion of the flux generated by the reverse winding and adapted to operate the controlling switch whenever the generator voltage rises to a predetermined value.

5. In an electric generating system and apparatus, an electric generator adapted to be driven at variable speed, the generator having a plurality of shunt field windings energized commensurably with the generated voltage and of normal polarity, and a shunt field winding of reverse polarity, a voltage regulator responsive to flux generated by the reverse polarity winding to control the generated voltage, a load circuit for the generator, a switch having contacts controlling the load circuit, a magnetically tractable switch-operating element disposed in the path of a portion of the flux generated by the reverse winding and adapted to operate the contacts whenever the generator voltage rises to a predetermined value.

6. In an electric generating system and apparatus, an electric generator adapted to be driven at variable speed, the generator having a plurality of shunt field windings energized commensurably with the generated voltage and of normal polarity, and a shunt field winding of reverse polarity, a switch in the circuit of the normal polarity windings adapted to reduce the energization thereof upon operation of the switch contacts, a load circuit for the generator, a switch having contacts controlling the load circuit, a pair of magnetically tractable switch-operating elements disposed respectively in the path of a portion of the flux generated by the reverse winding and adapted respectively to operate the contacts of their respective switches whenever the generator voltage rises to a predetermined value.

7. In an electric generating system and apparatus, an electric generator adapted to be driven at variable speed, the generator having a plurality of field windings energized commensurably with the generated voltage and of normal polarity, and a winding of reverse polarity, a switch in the circuit of the normal polarity windings adapted to reduce the energization thereof upon the operation of the switch contacts, a load circuit for the generator, a switch having contacts controlling the load circuit, a pair of local ferrous magnetic circuit elements linked with the reverse winding, a corresponding pair of magnetically tractable switch-operating elements controlling said switch contacts respectively and disposed in the paths of the flux generated in the respective elements by the reverse winding and adapted to operate their respective contacts whenever the generator voltage rises to a predetermined value.

8. As an article of manufacture adapted to be applied to an electric generator of the type comprising a relatively movable armature and field and a field flux producing winding, an electro-responsive device and an energizing circuit therefor, the energizing circuit comprising a winding formed to encircle a portion of the field flux path to oppose the flux therein produced by the field winding.

9. As an article of manufacture adapted to be applied to an electric generator of the type comprising a relatively movable armature and field and a field flux producing winding, an electro-responsive device and an energizing circuit therefor including a winding, comprising a portion formed to encircle a portion of the field flux path to oppose the flux therein produced by the field winding.

10. In an electric generator construction, a generator frame comprising a walled compartment having an aperture in the compartment wall, a generator armature disposed within said walled compartment, a field pole having a winding whereby it may be energized with magnetic flux of a normal polarity by current generated in the armature, a winding of opposite polarity on the pole and a circuit whereby it may be energized commensurably with voltage generated in the armature, a switch base disposed in the aperture and secured upon the compartment wall, an electro-magnetic switch supported on the base and comprising a magnetic circuit including a ferrous core element, a vibratory armature and switch contacts controlled by movement of the armature, and the winding of opposite polarity having a portion thereof looped around the ferrous core element.

11. A generator construction as described in claim 10 and in which the base has the switch armature and contacts disposed on the outer side of the base and the ferrous core element and winding on the inner side of the base.

12. In an accessory apparatus adapted to be applied to a variable speed variable voltage generator of the type having an aperture in the generator frame wall, to convert the generator into a substantially constant voltage generator, a base adapted to be disposed in the aperture, switch contacts and a magnetically tractable switch operating armature on the base outwardly thereof, an energizing ferrous magnetic circuit for the armature on the base inwardly thereof and comprising a core element, a winding on the core element, and a loop of the winding formed and disposed to be looped around a field pole of the generator.

13. In an electric generating system, a variable speed generator, comprising an armature and a work circuit, a cut-out switch comprising a core element, a magnetically tractable armature and contacts connected in the work circuit for closing and opening the work circuit and operable by the magnetically tractable armature at predetermined high and low generator voltage values, a relay comprising a core element, a magnetically tractable armature and contacts connected in a circuit controlling the field energization and operable by said magnetically tractable armature responsive to predetermined high and low voltage values to maintain the generator voltage substantially constant, a magnetic circuit for each armature comprising a common winding for both core elements, a circuit for energizing the winding commensurably with voltage generated in the armature, and a winding for one of the core elements and a circuit for energizing the winding commensurably with current in the work circuit.

14. In an accessory apparatus adapted to be applied to an electric generator of the type comprising a field pole, a base adapted to be secured to the generator frame, a magnetic switch on the base comprising a magnetic core, a winding on the core for magnetically energizing the same and formed with a loop adapted to be looped over a field pole of the generator.

15. In an accessory apparatus adapted to be applied to an electric generator of the type comprising a field pole, a base adapted to be secured to the generator frame, a magnetic switch on the base comprising a magnetic core, a winding having a portion formed to magnetically energize the core and a portion formed to be looped over a field pole of the generator.

16. In apparatus of the character described the combination of a variable speed generator having a field pole, a frame wall with an aperture therein, a base mounted on the generator frame and extending over at least a portion of said aperture, switch contacts and a magnetically tractable switch operating armature on one side of the base, an energizing ferrous magnetic circuit for the armature comprising a core element on the other side of the base and having magnetizable elements extending above the base into proximity with the switch operating armature, and a winding on the core element having a loop portion disposed around said field pole of the generator.

DALE S. COLE.
LEONARD S. SPETH.